(12) United States Patent
Chen (10) Patent No.: US 12,503,150 B2
(45) Date of Patent: Dec. 23, 2025

(54) STEERING ASSEMBLY AND AUTOMOBILE (71) Applicants: Beijing BOE Technology Development Co., Ltd., Beijing (CN); BOE Technology Group Co., Ltd., Beijing (CN)

(72) Inventor: Yuju Chen, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/765,378

(22) Filed: Jul. 8, 2024

(65) Prior Publication Data

US 2024/0359724 A1 Oct. 31, 2024

Related U.S. Application Data

(63) Continuation of application No. PCT/CN2023/082102, filed on Mar. 17, 2023.

(51) Int. Cl.
| | |
|---|---|
| *B62D 1/04* | (2006.01) |
| *B60K 35/10* | (2024.01) |
| *B60K 35/22* | (2024.01) |
| *B60K 35/25* | (2024.01) |
| *B60R 21/203* | (2006.01) |

(52) U.S. Cl.
CPC ............... *B62D 1/04* (2013.01); *B60K 35/10* (2024.01); *B60K 35/223* (2024.01); *B60K 35/25* (2024.01); *B60R 21/203* (2013.01); *B60K 2360/1438* (2024.01); *B60K 2360/782* (2024.01)

(58) Field of Classification Search
None
See application file for complete search history.

(56) References Cited

U.S. PATENT DOCUMENTS

| | | | |
|---|---|---|---|
| 9,552,148 B2 * | 1/2017 | Kim | ...................... G06F 3/0482 |
| 2018/0086297 A1 * | 3/2018 | Bodtker | ................ B60R 21/203 |

FOREIGN PATENT DOCUMENTS

| | | | |
|---|---|---|---|
| CN | 105172875 A | | 12/2015 |
| CN | 205239614 U | | 5/2016 |
| CN | 106741115 A | * | 5/2017 |
| CN | 209517506 U | | 10/2019 |
| CN | 115136096 A | | 9/2022 |
| CN | 115593496 A | | 1/2023 |
| DE | 102016001257 A1 | | 9/2016 |

* cited by examiner

*Primary Examiner* — Vicky A Johnson
(74) *Attorney, Agent, or Firm* — IPro, PLLC (57) ABSTRACT

A steering assembly includes: a steering wheel (1), a support frame (2) and a flexible touch display screen (3). The support frame (2) is arranged at a center of the steering wheel (1) and fixedly connected to the steering wheel (1). The flexible touch display screen (3) is fixed on the support frame (2) and includes a piezoelectric device (31). The steering assembly can realize the functions displayed on the steering wheel, and the haptic feedback function and sound-emitting function, enhancing the authenticity and immersion of human-computer interaction. An automobile is further provided.

20 Claims, 7 Drawing Sheets

STEERING ASSEMBLY AND AUTOMOBILE

CROSS REFERENCE TO RELATED APPLICATION

This application is a continuation of International Application No. PCT/CN2023/082102 filed Mar. 17, 2023, the entire contents of which are incorporated herein by reference.

TECHNICAL FIELD

The disclosure relates to the field of automobile technology, and in particular to a steering assembly and an automobile.

BACKGROUND

Haptic feedback is one of important ways of human-computer interaction. Compared with the mature audio-visual interaction technology, the haptic feedback is in a rapid development stage. Specifically, the haptic feedback can achieve texture reproduction such as material and shape as well as vibration haptic feedback. A terminal integrated with the haptic feedback can provide the authenticity and immersion in human-computer interaction.

SUMMARY

Embodiments of the disclosure provide a steering assembly and an automobile.

The steering assembly includes:
a steering wheel;
a support frame arranged at a center of the steering wheel and fixedly connected to the steering wheel; and
a flexible touch display screen fixed on the support frame, including a piezoelectric device.

In some embodiments, the steering assembly further includes an airbag fixed to a central area of the support frame. An orthographic projection of the piezoelectric device on the support frame does not overlap with an orthographic projection of the airbag on the support frame.

In some embodiments, in the steering assembly, the flexible touch display screen is arranged on at least one side of the airbag.

In some embodiments, in the steering assembly, the flexible touch display screen is arranged on both sides of the airbag.

In some embodiments, in the steering assembly, the flexible touch display screen is arranged above the airbag.

In some embodiments, in the steering assembly, the flexible touch display screen further includes a flexible display module and a flexible cover plate arranged on a light emitting side of the flexible display module. The flexible cover plate is larger than the flexible display module in size. The piezoelectric device and the flexible display module are arranged on a same side of the flexible cover plate. The piezoelectric device is arranged on the flexible cover plate outside the flexible display module.

In some embodiments, in the above steering assembly, there are a plurality of piezoelectric devices. The piezoelectric devices are arranged on all four sides of the flexible display module, or the piezoelectric devices are arranged on two opposite sides of the flexible display module.

In some embodiments, the steering assembly further includes an airbag fixed to a central area of the support frame. The flexible touch display screen is arranged above the airbag. The flexible touch display screen further includes a flexible display module and a flexible cover plate arranged on a light emitting side of the flexible display module. The piezoelectric device is arranged on one side of the flexible display module away from the flexible cover plate, and the piezoelectric device and the airbag are bonded by an adhesive layer.

In some embodiments, in the steering assembly, there are a plurality of piezoelectric devices, and the plurality of piezoelectric devices are arranged in an array.

In some embodiments, the steering assembly further includes a protective layer arranged on one side of the flexible cover plate away from the flexible display module.

In some embodiments, in the steering assembly, the flexible touch display screen further includes a touch layer arranged on one side of the flexible cover plate facing the flexible display module or on one side of the flexible cover plate away from the flexible display module.

In some embodiments, in the steering assembly, material of the flexible cover plate includes acrylic, polyimide, polyvinyl chloride, or polycarbonate.

In some embodiments, in the steering assembly, the flexible display module is an organic light emitting display module, a liquid crystal display module or an LED lamp bead.

In some embodiments, in the steering assembly, the piezoelectric device is a PZT piezoelectric film structure or a piezoelectric ceramic block structure.

Correspondingly, embodiments of the disclosure further provide an automobile, including the above steering assembly provided by the embodiments of the disclosure.

DETAILED DESCRIPTION

In order to make the purposes, technical solutions and advantages of the disclosure clearer, the technical solutions of the embodiments of the disclosure will be described clearly and completely below in combination with the accompanying drawings of the embodiments of the disclosure. Obviously the described embodiments are a part of the embodiments of the disclosure but not all the embodiments. Also in the case of no conflict, the embodiments and the features therein in the disclosure can be combined with each other. Based upon the embodiments of the disclosure, all of other embodiments obtained by those ordinary skilled in the art without creative work pertain to the protection scope of the disclosure.

Unless otherwise defined, the technical or scientific terms used in the disclosure shall have the general meaning understood by those ordinary skilled in the art to which the disclosure belongs. The word such as "include" or "contain" or the like used in the disclosure means that the element or object appearing before this word encompasses the elements or objects and their equivalents listed after this word, without excluding other elements or objects. The word such as "connect" or "connected" or the like is not limited to the physical or mechanical connection, but can include the electrical connection, whether direct or indirect. The words such as "inner", "outer", "up", "down" are only used to represent the relative position relationship. When the absolute position of a described object changes, the relative position relationship may also change accordingly.

It is necessary to note that the size and shape of each diagram in the accompanying drawings do not reflect the true proportion, and are merely for purpose of schematically illustrating the content of the disclosure. Also, the same or similar reference numbers represent the same or similar elements or the elements having the same or similar functions all the way.

Figure 1:
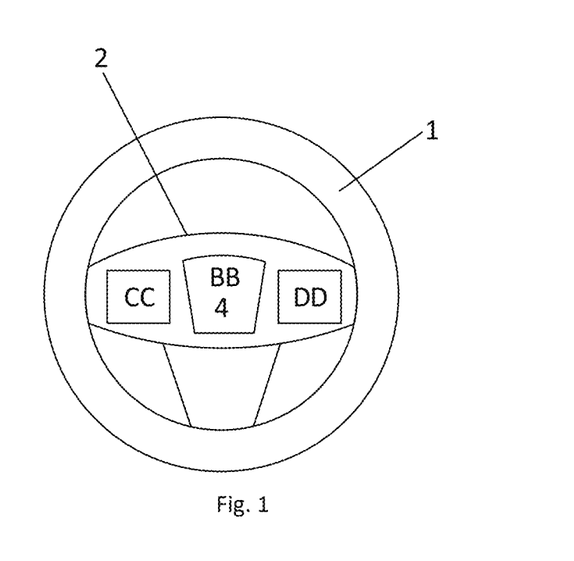
FIG. 1 is a schematic diagram of a planar structure of a steering assembly according to an embodiment of the disclosure.
Figure 2:
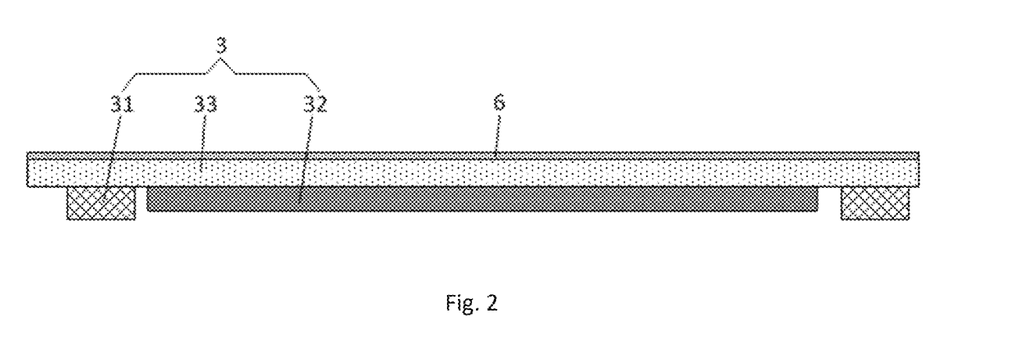
FIG. 2 is a cross-sectional schematic diagram of a flexible touch display screen.
Figure 3:
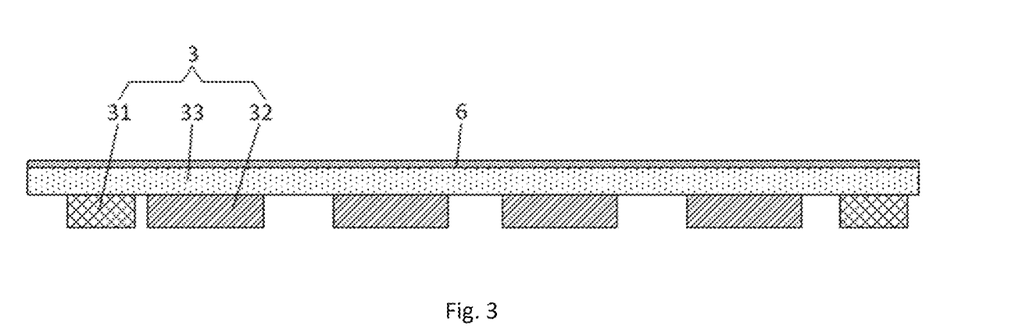
FIG. 3 is a cross-sectional schematic diagram of another flexible touch display screen.
Figure 4:
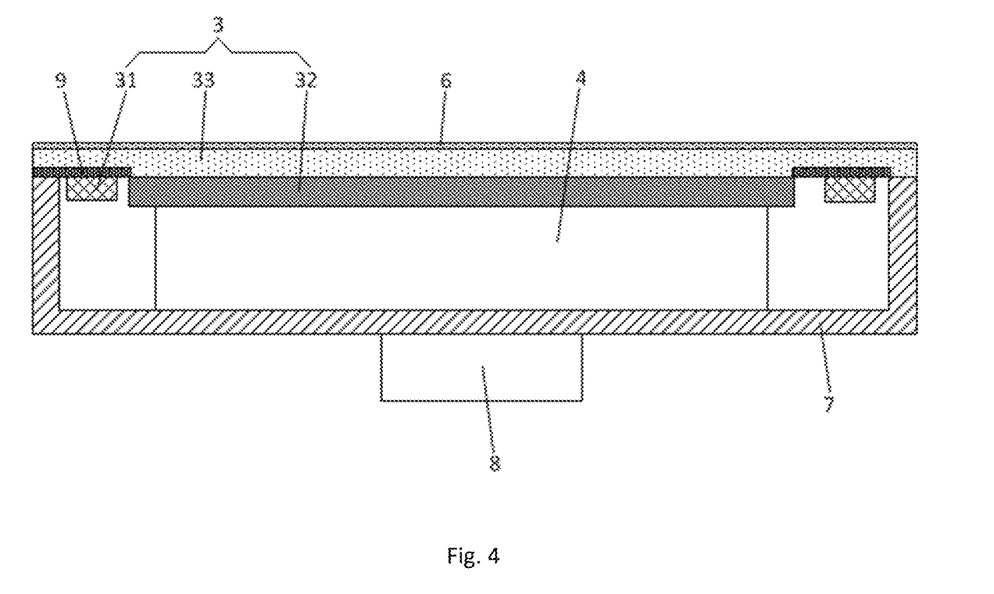
FIG. 4 is a cross-sectional schematic diagram of the flexible touch display screen shown in FIG. 2 arranged above the airbag in FIG. 1.

Embodiments of the disclosure provide a steering assembly, as shown in FIGS. 1 to 5. FIG. 1 is a schematic diagram of a planar structure of the steering assembly. FIGS. 2 to 4 are schematic diagrams of several cross-sections in FIG. 1, respectively.

The steering assembly includes:
a steering wheel 1, i.e., an annular handle, for a driver to hold with both hands;
a support frame 2 arranged at a center of the steering wheel 1 and fixedly connected to the steering wheel 1; where for example the support frame 2 may provide support and attachment for the steering wheel 1 and other parts to realize the steering function of the steering wheel 1, etc.; and
a flexible touch display screen 3 fixed on the support frame 2, including a piezoelectric device 31.

The piezoelectric device 31 may be deformed and vibrate under the action of an alternating electric field, and may drive the flexible touch display screen 3 to resonate and generate a haptic feedback signal. When a finger touches the surface of the flexible touch display screen 3, the change in friction can be clearly felt, thereby realizing haptic reproduction on the surface of the flexible touch display screen 3.

The steering assembly provided in embodiments of the disclosure utilizes the screen of the flexible touch display screen to realize the function of displaying on the steering wheel, to more conveniently provide the driver with more and richer information, such as driving information, navigation information, etc. The piezoelectric device of the flexible touch display screen is utilized to realize the haptic feedback function and sound-emitting function on the steering assembly. The design of the steering assembly integrating vision, touch and hearing with virtual touch and screen sound can be realized. The virtual touch can be realized on the flexible touch display screen and a corresponding sound prompt can be generated according to the haptic perception, thereby enhancing the authenticity and immersion of human-computer interaction, so that the rich information provided on the screen is maintained while the interactivity and safety reminder functions of traditional buttons are maintained during operation of the driver.

In some embodiments, as shown in FIG. 1, the steering assembly further includes an airbag 4 fixed to a central area BB of the support frame 2. The airbag 4 is generally positioned directly toward the driver to ensure that the airbag 4 is ejected to protect the driver when a dangerous situation occurs during driving. The steering assembly needs to meet the vehicle safety specifications, that is, no interference can be at the inflation and explosion position of the airbag 4 and the airbag 4 cannot produce any fragments during explosion. Thus, it is necessary to ensure that the piezoelectric device 31 does not interfere with the airbag 4 to prevent the piezoelectric device 31 from being ejected to the driver when the piezoelectric device 31 is integrated into the steering assembly. Therefore, in order to protect the driver from being injured by the piezoelectric device 31 that is shattered by the airbag 4, the orthographic projection of the piezoelectric device 31 on the support frame 2 does not overlap with the orthographic projection of the airbag 4 on the support frame 2, so that the airbag 4 and the piezoelectric device 31 in the flexible touch display screen 3 do not interfere with each other in terms of positional relationship. When a dangerous situation occurs during driving, the airbag 4 will not be ejected to the piezoelectric devices 31 on both sides during explosion, thus further ensuring the safety of the driver.

Figure 9A:
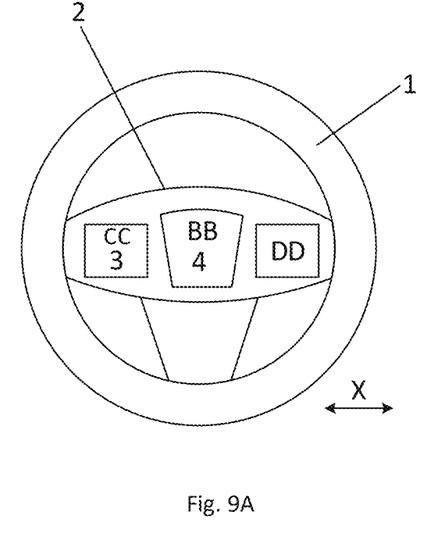
FIGS. 9A-9D each is a schematic diagram of a planar structure of a steering assembly according to an embodiment of the disclosure.
Figure 9B:
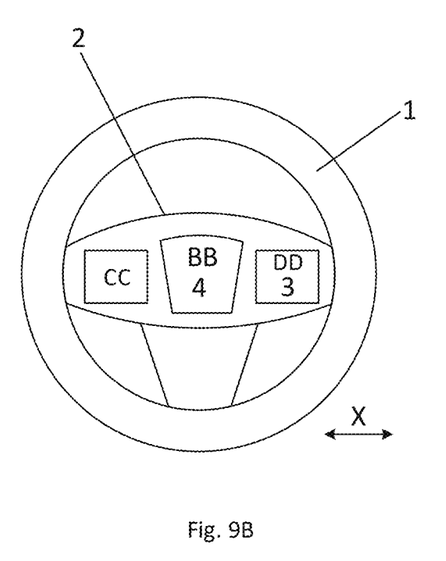
Figure 9C:
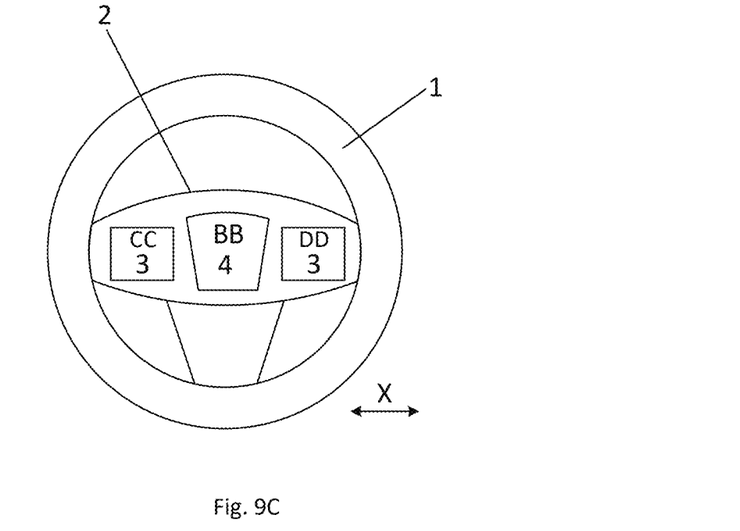

In some embodiments, the flexible touch display screen 3 may be arranged on at least one side of the airbag 4 along an extension direction X of the support frame 2. For example, as shown in FIG. 9A, the flexible touch display screen 3 is arranged in the left area CC, at left of the central area BB, of the support frame 2. Alternatively, as shown in FIG. 9B, the flexible touch display screen 3 is arranged in the right area DD, at right of the central area BB, of the support frame 2. In order to expand the display area to provide more driving information, as shown in FIG. 9C, the flexible touch display screen 3 may be arranged on each of both sides (i.e., in the CC and DD) of the airbag 4. Therefore, the flexible touch display screen(s) 3 including the piezoelectric device (3) 31 is/are arranged on one side or both sides of the airbag 4, to realize the integration of visual, haptic and auditory designs of the steering assembly without affecting the use of the airbag 4.

Figure 9D:
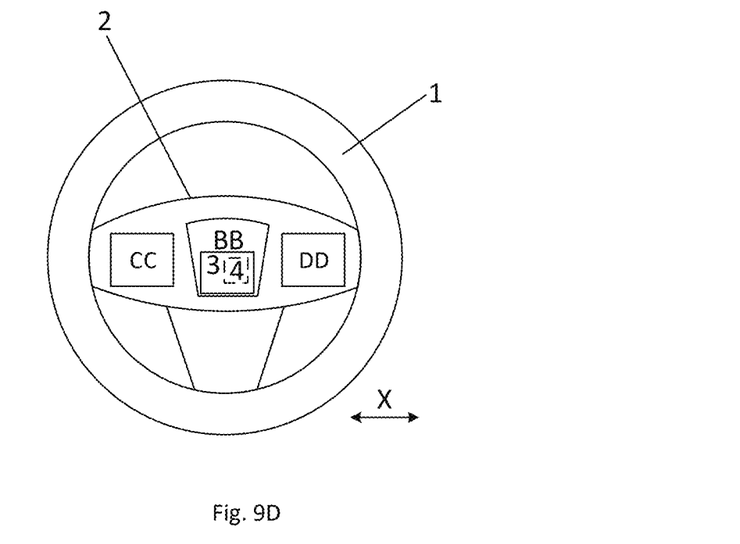

In some embodiments, in the above steering assembly, as shown in FIG. 9D, the flexible touch display screen 3 may also be arranged above the airbag 4. In this way, the orthographic projection of the piezoelectric device 31 on the support frame 2 does not overlap with the orthographic projection of the airbag 4 on the support frame 2 either by reasonably setting the position of the piezoelectric device 31 in the flexible touch display screen 3, so that the airbag 4 and the piezoelectric device 31 in the flexible touch display screen 3 do not interfere with each other in terms of positional relationship either, so as to ensure that the piezoelectric device 31 will not harm the driver when a dangerous situation occurs during driving.

In some embodiments, in the above steering assembly, as shown in FIGS. 2 and 3, the flexible touch display screen 3 further includes a flexible display module 32 and a flexible cover plate 33 arranged on a light emitting side of the flexible display module 32. The flexible cover plate 33 is larger than the flexible display module 32 in size. The piezoelectric device 31 and the flexible display module 32 are arranged on a same side of the flexible cover plate 33. The piezoelectric device 31 is arranged on the flexible cover plate 33 outside the flexible display module 32. The vibration of the piezoelectric device 31 can drive the flexible cover plate 33 to achieve the low-frequency or high-frequency vibration. Thus, on the one hand, the piezoelectric device 31 will not affect the display effect of the flexible touch display screen 3; and on the other hand, no matter whether the flexible touch display screen 3 is arranged on side(s) of the airbag 4 or above the airbag 4, it can be ensured that the orthographic projection of the piezoelectric device 31 on the support frame 2 does not overlap with the orthographic projection of the airbag 4 on the support frame 2 either, so as to ensure that the airbag 4 and the piezoelectric device 31 do not interfere with each other in terms of positional relationship, and thus ensure that the piezoelectric device 31 will not harm the driver when a dangerous situation occurs during driving.

In some embodiments, in the above steering assembly, as shown in FIG. 2 which is a cross-sectional schematic diagram of a flexible touch display screen 3, the flexible display module 32 may be an Organic Light-Emitting Display module (OLED) or a Liquid Crystal Display module (LCD). As shown in FIG. 3 which is a cross-sectional schematic diagram of another flexible touch display screen 3, the flexible display module 32 may be an LED lamp bead. The brightness of the LED lamp bead may be controlled by the PCB and the MCU. The displayed graphics are controlled by the light-transmitting area of the flexible cover plate 33.

In some embodiments, in the above steering assembly, the flexible touch display screen 3 shown in FIG. 2 or 3 may be integrated in the area CC or DD in FIG. 1, or the flexible touch display screen 3 shown in FIG. 2 or 3 may be integrated in the areas CC and DD in FIG. 1. That is, the flexible touch display screen(s) 3 is/are integrated on one side or both sides of the airbag.

In some embodiments, as shown in FIG. 4, FIG. 4 is a cross-sectional schematic diagram of the flexible touch display screen 3 shown in FIG. 2 arranged above the airbag 4 in FIG. 1. Since the piezoelectric device 31 is arranged on the flexible cover plate 33 outside the flexible display module 32, it can be ensured that the piezoelectric device 31 and the airbag 4 do not interfere with each other in position.

Figure 6A:
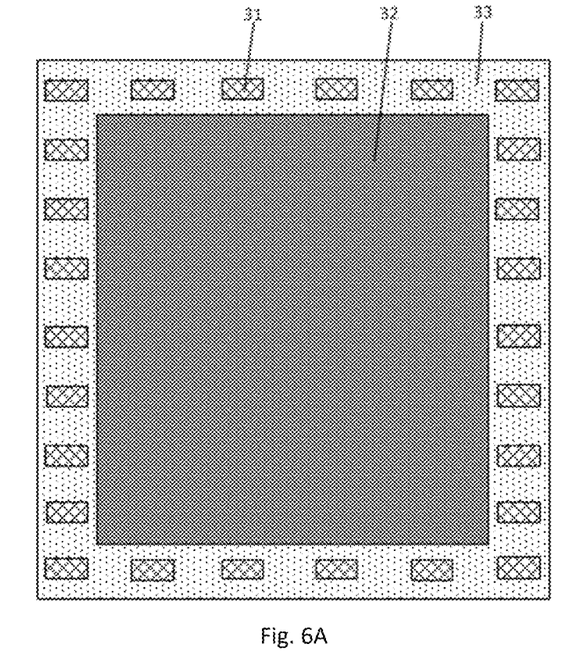
FIG. 6A is a schematic plan view of a flexible touch display screen.
Figure 6B:
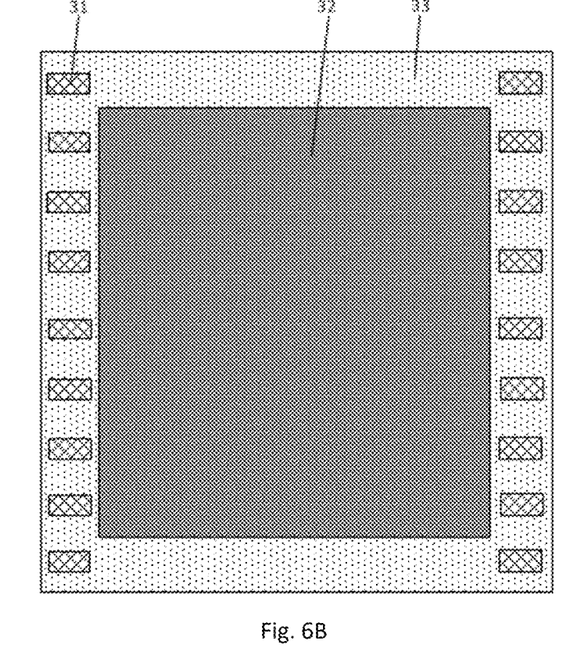
FIG. 6B is a schematic plan view of another flexible touch display screen.

In some embodiments, in the above steering assembly, as shown in FIGS. 2 to 4, there may be a plurality of piezoelectric devices 31 to improve the haptic feedback effect. In some embodiments, the piezoelectric devices 31 may be arranged on all four sides of the flexible display module 32, as shown in FIG. 6A, which is a schematic plan view of the flexible touch display screen 3; or the piezoelectric devices 31 are arranged on two opposite sides of the flexible display module 32, as shown in FIG. 6B, which is another schematic plan view of the flexible touch display screen 3.

Figure 5:
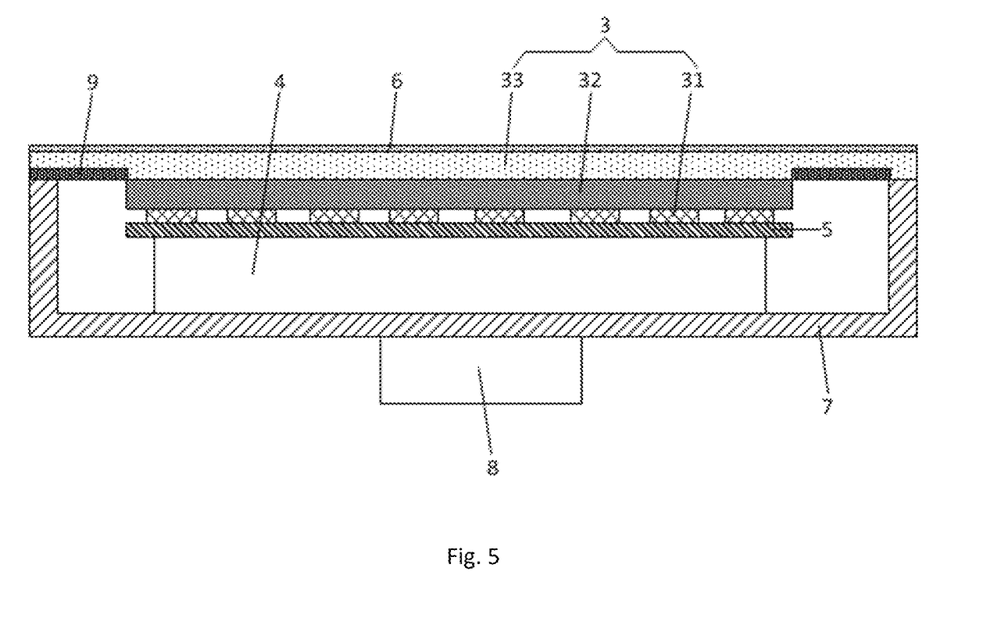
FIG. 5 is another cross-sectional schematic diagram of the flexible touch display screen shown in FIG. 2 arranged above the airbag in FIG. 1.

In some embodiments, as shown in FIGS. 1 and 5, the above steering assembly further includes an airbag 4 fixed to the central area BB of the support frame 2. The flexible touch display screen 3 is arranged above the airbag 4. FIG. 5 is another cross-sectional schematic diagram of the flexible touch display screen 3 shown in FIG. 2 arranged above the airbag 4 in FIG. 1. The flexible touch display screen 3 further includes a flexible display module 32 and a flexible cover plate 33 arranged on a light emitting side of the flexible display module 32. The piezoelectric device 31 is arranged on one side of the flexible display module 32 away from the flexible cover plate 33. The piezoelectric device 31 and the airbag 4 are bonded by an adhesive layer 5. For example, the adhesive layer 5 may be soft adhesive (VHB adhesive). The piezoelectric device 31 and the flexible display module 32 are also fixedly connected by an adhesive layer (such as optical adhesive, etc.). In this way, although the piezoelectric device 31 is arranged between the flexible display module 32 and the airbag 4, the piezoelectric device 31 will not be ejected due to the buffering effect of the adhesive layer 5 even if the airbag 4 explodes because the piezoelectric device 31 is wrapped by the optical adhesive and the adhesive layer 5 on upper and lower sides, thereby ensuring the safety of the driver.

In some embodiments, as shown in FIG. 2 to FIG. 5, the flexible cover plate 33 and the flexible display module 32 are fully bonded together by the OCA or OCR glue.

In some embodiments, as shown in FIG. 2 to FIG. 5, the shape of the flexible cover plate 33 may be a plane or a curved surface, which does not affect the product characteristics.

Figure 7:
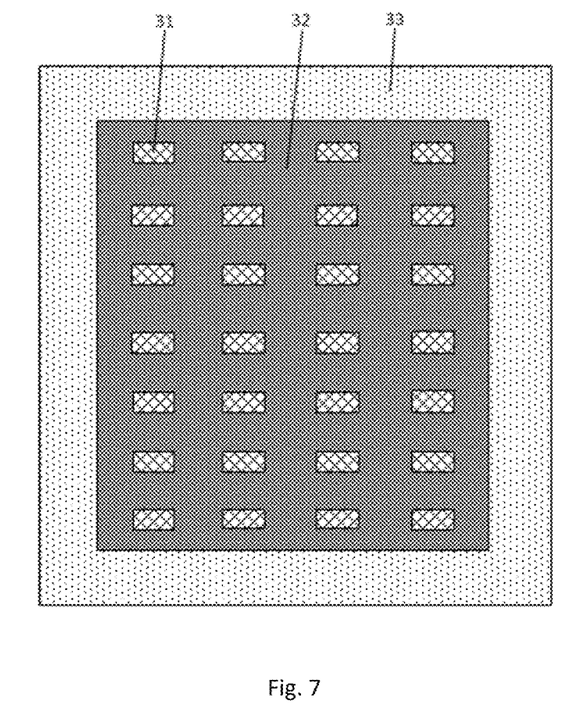
FIG. 7 is a schematic plan view of the flexible touch display screen in FIG. 5.

In some embodiments, in the above steering assembly, as shown in FIG. 7, which is a schematic plan view of the flexible touch display screen 3 in FIG. 5, there may be a plurality of piezoelectric devices 31. The plurality of piezoelectric devices 31 are arranged in an array, to make the vibration of each position of the flexible cover plate more uniform and improve the haptic feedback effect.

In some embodiments, in the above steering assembly, as shown in FIGS. 6A to 7, the width of the piezoelectric device 31 is less than 15 mm. The length of the piezoelectric device 31 is about 20 mm. The gap between the piezoelectric devices 31 is less than 1 mm. The thickness of the piezoelectric device 31 needs to be less than the thickness of the flexible cover plate 33. As shown in FIGS. 2 to 4, the distance between the piezoelectric device 31 and the edge of the flexible cover plate 33 is less than 5 mm.

In some embodiments, in the above steering assembly, as shown in FIGS. 6A to 7, the connection between the piezoelectric devices 31 may use a parallel design or a series design. The phases of the electrical signals loaded on all piezoelectric devices 31 are the same, the vibration displacement (amplitude) needs to be greater than 1 μm, and the vibration acceleration is greater than 1 G (9.8 m/s2).

In some embodiments, as shown in FIG. 2 to FIG. 5, the above steering assembly further includes a protective layer 6 arranged on one side of the flexible cover plate 33 away from the flexible display module 32. For example, the protective layer 6 has anti-wear and anti-reflection functions, and prevents the flexible touch display screen from breaking and providing the initial friction. The friction coefficient between the protective layer 6 and the finger is 0.4 to 0.7. The light transmittance of the protective layer 6 is greater than 90%. The thickness of the protective layer 6 is greater than 30 μm. The material of the protective layer 6 may be acrylic or polyethylene terephthalate (PET).

In some embodiments, in the above steering assembly, as shown in FIGS. 2 to 5, the flexible touch display screen 3 further includes a touch layer (not shown), which may be arranged on one side of the flexible cover plate 33 facing the flexible display module 32 or on one side of the flexible cover plate 33 away from the flexible display module 32. For example, the touch layer is arranged in the flexible touch display screen 3, and may be resistive touch or capacitive touch. For example, when a finger touches the surface of the flexible touch display screen 3, the touch coordinate position of the finger is determined by detecting the capacitance change, thereby realizing the touch function. The specific structure and working principle of the touch layer are the same as those in the prior art and will not be described in detail here.

In some embodiments, in the above steering assembly, as shown in FIGS. 2 to 5, the material of the flexible cover plate 33 may include but is not limited to acrylic, polyimide (PI), polyvinyl chloride (PVC), or polycarbonate (PC).

In some embodiments, in the above steering assembly, as shown in FIGS. 2 to 5, the thickness of the flexible cover plate 33 is less than 1.5 mm.

In some embodiments, in the above steering assembly, as shown in FIGS. 2 to 5, the piezoelectric device 31 may be a PZT piezoelectric film structure or a piezoelectric ceramic block structure. For example, the thickness of the piezoelectric device 31 is less than 1000 μm, and the d33 characteristic of the piezoelectric device 31 is greater than 50 pC/N.

In some embodiments, taking the piezoelectric device as a PZT piezoelectric film structure as an example, the piezoelectric device 31 may include a first electrode layer, a piezoelectric material layer and a second electrode layer that are stacked. The first electrode layer may be grounded, and the second electrode layer may be connected to a drive signal terminal. A high-frequency alternating voltage signal (VAC) is loaded to the second electrode layer through the inverse piezoelectric effect, so that an alternating electric field can be formed between the first electrode layer and the second electrode layer, and the frequency of the alternating electric field is the same as the frequency of the alternating voltage signal. Under the action of the alternating electric field, the piezoelectric material layer deforms and generates a vibration signal. The frequency of the vibration signal is the same as the frequency of the alternating electric field. When the frequency of the vibration signal is close to or equal to the natural frequency of the flexible cover plate, the flexible cover plate resonates, the amplitude is enhanced, and a haptic feedback signal is generated. When a finger touches the surface of the flexible cover plate, the change in friction force can be clearly felt. In practical applications, the friction force on the surface of the flexible cover plate can be adjusted through the resonance generated between the piezoelectric layer and the flexible cover plate, so as to realize the texture reproduction of the object on the surface of the flexible cover plate.

In some embodiments, the material of the first electrode layer and the second electrode layer is a transparent conductive material, such as Indium Tin Oxide (ITO) or Indium Zinc Oxide (IZO), etc. The material of the first electrode layer and the second electrode layer may be set by those skilled in the art according to actual application requirements, and is not limited here.

In some embodiments, the piezoelectric material layer is not limited to the lead zirconate titanate ($Pb(Zr,Ti)O_3$, PZT) mentioned above, but may also be at least one of aluminum nitride (AlN), ZnO (zinc oxide), barium titanate ($BaTiO_3$), lead titanate ($PbTiO_3$), potassium niobate ($KNbO_3$), lithium niobate ($LiNbO_3$), lithium tantalate ($LiTaO_3$), and gallium lanthanum silicate ($La_3Ga_5SiO_{14}$). For example, the material for making the piezoelectric material layer may be selected according to actual application requirements of those skilled in the art, and is not limited here. Here, when PZT is used to make the piezoelectric material layer, the piezoelectric properties of the steering assembly are guaranteed due to the high piezoelectric coefficient of PZT.

In some embodiments, the above steering assembly provided by the embodiments of the disclosure, as shown in FIGS. 4 and 5, further includes: a packaging structure 7 for packaging the airbag 4 and the flexible touch display screen 3, a steering column 8 arranged below the airbag 4 and the packaging structure 7, and a light shielding layer 9 arranged between the piezoelectric device 31 and the flexible cover plate 33. Of course, the steering assembly provided by the embodiments of the disclosure may also include other structures well known to those skilled in the art, such as a coating layer such as leather covering the outer surface of the steering assembly. These structures are the same as those in the prior art and will not be described in detail in the disclosure.

Figure 8A:
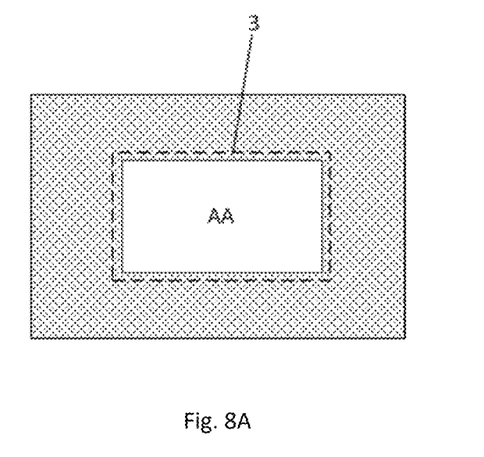
FIG. 8A is a shape of a display area finally presented on a flexible touch display screen.
Figure 8B:
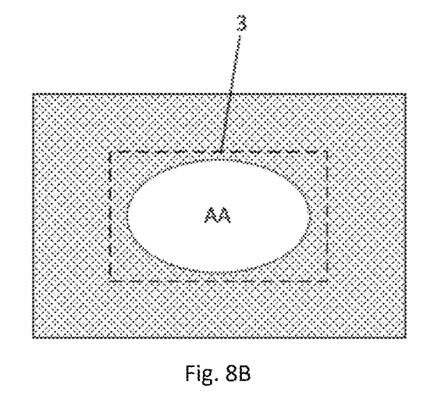
FIG. 8B is another shape of a display area finally presented on a flexible touch display screen.
Figure 8C:
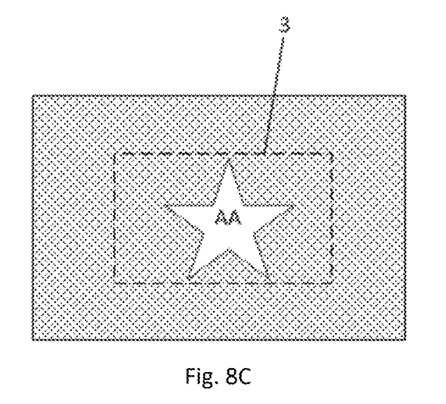
FIG. 8C is yet another shape of a display area finally presented on a flexible touch display screen.
Figure 8D:
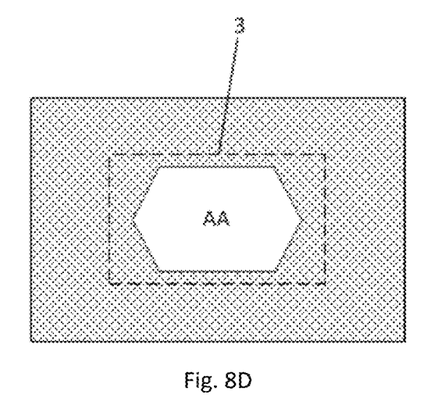
FIG. 8D is yet another shape of a display area finally presented on a flexible touch display screen.

In some embodiments, in the above steering assembly, the area of the display area finally presented by the flexible touch display screen on the flexible cover plate must be less than the entire area of the flexible touch display screen itself. The shape of the display area finally presented by the flexible touch display screen may be, but not limited to, square, circle, pentagon, hexagon, etc. For example, as shown in FIG. 8A, the shape of the display area AA finally presented by the flexible touch display screen 3 is a square; as shown in FIG. 8B, the shape of the display area AA finally presented by the flexible touch display screen 3 is a circle; as shown in FIG. 8C, the shape of the display area AA finally presented by the flexible touch display screen 3 is a pentagon; and as shown in FIG. 8D, the shape of the display area AA finally presented by the flexible touch display screen 3 is a hexagon.

Based on the same inventive concept, embodiments of the disclosure further provide an automobile, including the above steering assembly provided in the disclosure. Since the principle of the automobile to solve the problem is similar to that of the above steering assembly, the implementations of the automobile can refer to the implementations of the above steering assembly, and the repeated description thereof will be omitted.

The steering assembly and the automobile provided by embodiments of the disclosure utilize the screen of the flexible touch display screen to realize the function of displaying on the steering wheel, to more conveniently provide the driver with more and richer information, such as driving information, navigation information, etc. The piezoelectric device of the flexible touch display screen is utilized to realize the haptic feedback function and sound-emitting function on the steering assembly. The design of the steering assembly integrating vision, touch and hearing with virtual touch and screen sound can be realized. The virtual touch can be realized on the flexible touch display screen and a corresponding sound prompt can be generated according to the haptic perception, thereby enhancing the authenticity and immersion of human-computer interaction, so that the rich information provided on the screen is maintained while the interactivity and safety reminder functions of traditional buttons are maintained during operation of the driver.

Although the preferred embodiments of the disclosure have been described, those skilled in the art can make additional alterations and modifications to these embodiments once they learn about the basic creative concepts. Thus, the attached claims are intended to be interpreted to include the preferred embodiments as well as all the alterations and modifications falling within the scope of the disclosure.

Evidently, those skilled in the art can make various modifications and variations to the embodiments of the disclosure without departing from the spirit and scope of the embodiments of the disclosure. Thus, the disclosure is also intended to encompass these modifications and variations to the embodiments of the disclosure as long as these modifications and variations come into the scope of the claims of the disclosure and their equivalents.

What is claimed is:

1. A steering assembly, comprising:
   a steering wheel;
   a support frame arranged at a center of the steering wheel and fixedly connected to the steering wheel; and
   a flexible touch display screen fixed on the support frame, comprising a piezoelectric device;
   wherein the piezoelectric device is a PZT piezoelectric film structure or a piezoelectric ceramic block structure.

2. The steering assembly according to claim 1, further comprising:
   an airbag fixed to a central area of the support frame;
   wherein an orthographic projection of the piezoelectric device on the support frame does not overlap with an orthographic projection of the airbag on the support frame.

3. The steering assembly according to claim 2, wherein the flexible touch display screen is arranged on at least one side of the airbag along an extension direction of the support frame.

4. The steering assembly according to claim 3, wherein the flexible touch display screen is arranged on both sides of the airbag along the extension direction of the support frame.

5. The steering assembly according to claim 2, wherein the flexible touch display screen is arranged above the airbag.

6. The steering assembly according to claim 2, wherein the flexible touch display screen further comprises:
   a flexible display module, and
   a flexible cover plate arranged on a light emitting side of the flexible display module,
   wherein the flexible cover plate is larger than the flexible display module in size, the piezoelectric device and the flexible display module are arranged on a same side of the flexible cover plate, and the piezoelectric device is arranged on the flexible cover plate outside the flexible display module.

7. The steering assembly according to claim 6, further comprising:
   a protective layer arranged on a side of the flexible cover plate away from the flexible display module.

8. The steering assembly according to claim 6, wherein the flexible touch display screen further comprises:
   a touch layer arranged on a side of the flexible cover plate facing the flexible display module or on a side of the flexible cover plate away from the flexible display module.

9. The steering assembly according to claim 6, wherein material of the flexible cover plate comprises acrylic, polyimide, polyvinyl chloride, or polycarbonate.

10. The steering assembly according to claim 6, wherein the flexible display module is an organic light emitting display module, a liquid crystal display module or an LED lamp bead.

11. The steering assembly according to claim 6, wherein there are a plurality of piezoelectric devices, and the piezoelectric devices are arranged on all four sides of the flexible display module, or the piezoelectric devices are arranged on two opposite sides of the flexible display module.

12. The steering assembly according to claim 1, further comprising:
   an airbag fixed to a central area of the support frame,
   wherein the flexible touch display screen is arranged above the airbag; the flexible touch display screen further comprises:
   a flexible display module, and
   a flexible cover plate arranged on a light emitting side of the flexible display module,
   wherein the piezoelectric device is arranged on a side of the flexible display module away from the flexible cover plate, and the piezoelectric device and the airbag are bonded by an adhesive layer.

13. The steering assembly according to claim 12, wherein there are a plurality of piezoelectric devices, and the plurality of piezoelectric devices are arranged in an array.

14. An automobile, comprising the steering assembly according to claim 1.

15. A steering assembly, comprising:
   a steering wheel;
   a support frame arranged at a center of the steering wheel and fixedly connected to the steering wheel;
   a flexible touch display screen fixed on the support frame, comprising a piezoelectric device;
   an airbag fixed to a central area of the support frame;
   wherein an orthographic projection of the piezoelectric device on the support frame does not overlap with an orthographic projection of the airbag on the support frame;
   wherein the flexible touch display screen further comprises:
   a flexible display module, and
   a flexible cover plate arranged on a light emitting side of the flexible display module,
   wherein the flexible cover plate is larger than the flexible display module in size, the piezoelectric device and the flexible display module are arranged on a same side of the flexible cover plate, and the piezoelectric device is arranged on the flexible cover plate outside the flexible display module.

16. The steering assembly according to claim 15, wherein the flexible touch display screen is arranged on at least one side of the airbag along an extension direction of the support frame.

17. The steering assembly according to claim 15, wherein the flexible touch display screen is arranged above the airbag.

18. The steering assembly according to claim 15, wherein there are a plurality of piezoelectric devices, and the piezoelectric devices are arranged on all four sides of the flexible display module, or the piezoelectric devices are arranged on two opposite sides of the flexible display module.

19. A steering assembly, comprising:
   a steering wheel;
   a support frame arranged at a center of the steering wheel and fixedly connected to the steering wheel;
   a flexible touch display screen fixed on the support frame, comprising a piezoelectric device;
   an airbag fixed to a central area of the support frame,
   wherein the flexible touch display screen is arranged above the airbag; the flexible touch display screen further comprises:
   a flexible display module, and
   a flexible cover plate arranged on a light emitting side of the flexible display module,
   wherein the piezoelectric device is arranged on a side of the flexible display module away from the flexible cover plate, and the piezoelectric device and the airbag are bonded by an adhesive layer.

20. The steering assembly according to claim 19, wherein there are a plurality of piezoelectric devices, and the plurality of piezoelectric devices are arranged in an array.

\* \* \* \* \*